Patented Sept. 7, 1937

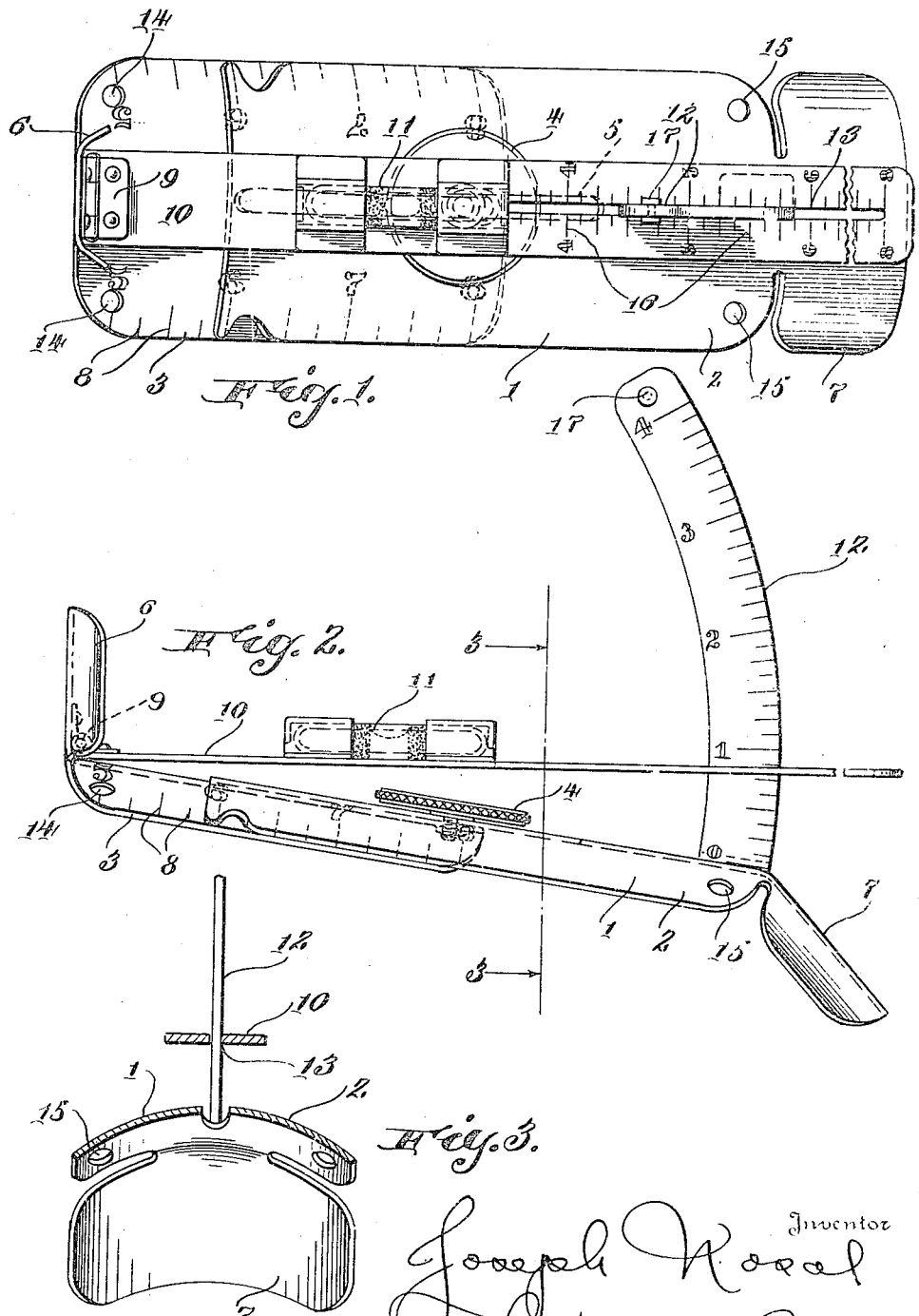

2,092,179

UNITED STATES PATENT OFFICE 2,092,179

SHOULDER MEASURING INSTRUMENT

Joseph Nosal, Baltimore, Md.

Application October 29, 1936, Serial No. 108,120

1 Claim. (Cl. 33—7)

My invention relates to a shoulder measuring instrument. The demand in the tailoring trade today is to give the customer a correct fit and to produce clothes in large quantity. It is no longer possible for the skilled tailor to produce suits by the former methods used and to obtain a reasonable profit. The fit of the shoulders is most important in fitting a suit. With my instrument, the slope of the shoulder of the customer may be accurately measured very rapidly, and this measurement, in relation to the width of the shoulder, may be reproduced at any time thereafter. Also, the sloping width of the shoulder may be determined and reproduced in the garment to be made at any future time. The instrument will, however, find its largest use in making alterations to "ready-made" clothes. Should the shoulders of a person not be uniform, either in width or slope, the accurate measurement for each shoulder may be made with this instrument. Some devices for performing some of these functions have been made in the past, but most of them require an expert to obtain uniform and accurate measurements, whereas, with this instrument, a much less skilled person may make measurements quickly and accurately.

The full nature of the invention will be understood from the accompanying drawing and the following description and claim.

In the drawing, Figure 1 is a top plan view of the instrument. Figure 2 is a front elevation thereof, and Figure 3 is a sectional view on line 3—3 of Figure 2, looking in the direction of the arrows.

Similar numerals refer to similar parts in the several views.

The shoulder beam, 1, is in two pieces, 2 and 3, the latter having a thumb screw, 4, therein, and the former having a slot 5 in its center through which the thumb screw passes to hold the sections 2 and 3 together in any adjusted position. The beam 1 is curved as shown, by means of which it better fits the person being measured, and the curving also causes accurate alignment of the two sections with only the one screw. Section 3 has a collar stop 6 thereon, so that the beam may be placed accurately against the collar of the person being measured, and the stop makes it possible to relocate this exact position at any future time and also upon the new garment being made. The section 2 of the beam has a stop 7 at its lower end which fits over the upper arm, right at the shoulder bend. This stop makes it possible to locate accurately the outer point for measuring the width of the shoulder. When the collar stop 6 and the arm stop 7 are accurately against the collar and upper arm or shoulder, respectively, and the thumb screw 4 is then tightened, the accurate sloping width of the shoulder can be read on scale 8. The location of the upper end of section 2 on the scale 8 gives the actual measurement.

Pivoted to the beam 1 adjacent the collar stop 6 by hinge 9 is a bar 10 having a spirit level 11 thereon to indicate when the bar is horizontal. Projecting upwardly from the end of section 2 of beam 1 is an arcuate scale 12, passing through a slot 13 in bar 10. When bar 10 is horizontal, as shown by the level, the slope of the shoulder may be determined from scale 12.

The slope of the shoulder and the length or width of the shoulder, are functions of each other, and their reproduction in a garment are dependent on an accurate measurement of both. Only a measurement of one, or a measurement of both without relation to each other, will not enable the tailor quickly and accurately to construct a garment having those measurements. By this instrument such measurements are taken, and may be reconstructed quickly and accurately, by one not skilled as a measurer.

Strings may be passed through holes 14 and around the neck or under the opposite arm from the shoulder being measured to hold the collar stop in exact location. Likewise, strings may be passed through holes 15 and under the arm of the shoulder being measured to hold the arm stop 7 in place. These holes 15 could be used to attach a measuring tape to, to get the accurate measure of the arm hole, if desired.

A scale 16 on bar 10, registering with the far edge of scale 12 gives the same measurement as scale 8. A pin 17 in the top of scale 8 may be inserted to keep bar 10 from coming off scale 8.

The device may be used in connection with any system adapted for cutting garments for men and women. It does away with all guesswork in shaping the shoulders of garments.

The invention claimed is:

A shoulder measuring instrument comprising a shoulder beam, a collar stop at one end of said beam and an arm stop at the other end of said beam, a horizontal bar pivoted to said beam adjacent said collar stop, a spirit level on said bar to indicate when the same is horizontal, an arcuate scale projecting from said beam at said arm stop and registering with said bar to give the spread of said beam and bar when the latter is horizontal, said arm stop and scale being movable with respect to its distance from said collar stop and means to determine the distance of said scale from said stop.

JOSEPH NOSAL.